(12) United States Patent
Roberts (10) Patent No.: US 12,117,066 B2
(45) Date of Patent: Oct. 15, 2024

(54) CORD STOPPER AND METHODS FOR USING AND MANUFACTURING THE SAME

(71) Applicant: David Roberts, Sevenoaks (GB)

(72) Inventor: David Roberts, Sevenoaks (GB)

(73) Assignee: David Roberts, Sevenoaks (GB)

( * ) Notice: Subject to any disclaimer, the term of this patent is extended or adjusted under 35 U.S.C. 154(b) by 0 days.

(21) Appl. No.: 18/042,154

(22) PCT Filed: Sep. 21, 2021

(86) PCT No.: PCT/EP2021/075886
§ 371 (c)(1),
(2) Date: Feb. 17, 2023

(87) PCT Pub. No.: WO2022/063753
PCT Pub. Date: Mar. 31, 2022

(65) Prior Publication Data
US 2023/0358296 A1    Nov. 9, 2023

(30) Foreign Application Priority Data
Sep. 28, 2020  (GB) .................................. 2015317

(51) Int. Cl.
*F16G 11/10* (2006.01)
(52) U.S. Cl.
CPC .................................. *F16G 11/106* (2013.01)
(58) Field of Classification Search
CPC ... F16G 11/103; F16G 11/106; Y10T 24/3918
See application file for complete search history.

(56) References Cited

U.S. PATENT DOCUMENTS

| 3,574,900 A | 4/1971 | Emery |
| 3,988,810 A | 11/1976 | Emery |
| (Continued) | | |

FOREIGN PATENT DOCUMENTS

| DE | 202020002101 U1 | 5/2020 |
| EP | 2574366 A1 | 4/2013 |
| (Continued) | | |

OTHER PUBLICATIONS

Clamcleats Company History. Website [online]. Clamcleats Limited, 2022. 2 pages [retrieved on Feb. 17, 2023]. Retrieved from the Internet: <URL: www.clamcleat.com/about-us/company-history.html>.

(Continued)

*Primary Examiner* — Robert Sandy
(74) *Attorney, Agent, or Firm* — Withrow + Terranova, PLLC; Vincent K. Gustafson (57) ABSTRACT

A cord stopper for moving along a length of cord and releasably engaging the cord includes a body delimiting a channel for passing the cord through the body. The channel defines a first path and a second path for the cord, with the paths being selectable by rotating the body relative to the cord. A cord engagement portion provided along the first path is configured to engage the cord such that movement of the cord stopper along the cord is restricted when the first path is selected. A cord passing portion in the channel is configured to permit the cord stopper to move along the length of the cord when the second path is selected. Further provided are a cord stopper assembly including the cord stopper and the cord, and methods. Methods of using and manufacturing the cord stopper.

20 Claims, 5 Drawing Sheets

(56) References Cited

U.S. PATENT DOCUMENTS

| | | | | |
|---|---|---|---|---|
| 4,896,403 | A | * | 1/1990 | Vouros ............... E04H 15/322 |
| | | | | 24/130 |
| 5,802,679 | A | * | 9/1998 | Neeley ................ B63B 21/08 |
| | | | | 24/130 |
| 6,381,816 | B1 | * | 5/2002 | Lai ...................... A43C 7/00 |
| | | | | 24/712.9 |
| D466,792 | S | | 12/2002 | Knopp |
| 2009/0249586 | A1 | | 10/2009 | Brown |
| 2010/0139051 | A1 | | 6/2010 | Bourke et al. |
| 2016/0339318 | A1 | | 11/2016 | Dupont |

FOREIGN PATENT DOCUMENTS

| | | | |
|---|---|---|---|
| FR | 2740663 | A1 | 5/1997 |
| FR | 2888906 | A1 | 1/2007 |
| GB | 2575488 | A | 1/2020 |

OTHER PUBLICATIONS

International Search Report (Form PCT/ISA/210) for International Application No. PCT/EP2021/075886 mailed Jan. 7, 2022, 4 pages.
Written Opinion of the International Searching Authority (Form PCT/ISA/237) for International Application No. PCT/EP2021/075886 mailed Jan. 7, 2022, 5 pages.
Search Report under Section 17 for United Kingdom Patent Application No. GB2015317.7 dated Feb. 23, 2021, 2 pages.

* cited by examiner

CORD STOPPER AND METHODS FOR USING AND MANUFACTURING THE SAME

CROSS-REFERENCE TO RELATED APPLICATIONS

This application is a 35 U.S.C. § 371 national phase filing of International Application No. PCT/EP2021/075886 filed Sep. 21, 2021, and claims priority to United Kingdom Patent Application No. 2015317.7 filed Sep. 28, 2020. The entire contents of the foregoing applications are hereby incorporated by reference herein.

FIELD OF THE INVENTION

This invention relates to a cord stopper which is moveable along a cord.

BACKGROUND OF THE INVENTION

Cord stoppers, also known as cord locks, cord fasteners, spring clasps and cord toggles, can be moved along a cord to a desired position and secured to the cord at that position. The cord stopper can be subsequently released and moved to a new position along the cord when desired by the user.

Conventional cord stoppers tend to include a ball- or barrel-shaped body and a sprung loaded plunger received in a channel extending through the body. Holes are defined in the body and the plunger through which the cord is passed. The plunger is biased by a spring such that the cord is squeezed between a side of the hole in the body and an opposing side of the hole in the plunger when the cord stopper is secured to the cord. The cord stopper also includes a button which can be pressed in order to compress the spring and thereby release the cord. The cord stopper can then be moved to a new position along the cord.

Whilst ubiquitous, such conventional cord stoppers have certain disadvantages. Their moving parts mean that they may be susceptible to reliability problems, particularly when used for applications involving high frequency of use, such as for drawstrings in items of clothing and bags. The moving parts may also pose problems for use in outdoor environments.

Moreover, the multicomponent construction of such conventional cord stoppers may mean that their mass manufacture is relatively complex and costly. Attempts to reduce the cost of manufacture may also exacerbate the above-described reliability problems.

SUMMARY OF THE INVENTION

The invention is defined by the claims.

Provided is a cord stopper for moving along a length of cord and releasably engaging the cord, the cord stopper comprising a body delimiting a channel for passing the cord through the body, wherein a first path and a second path for the cord are defined in the channel, the first path or the second path being selectable by rotating the body relative to the cord, and wherein a cord engagement portion is provided along the first path, the cord engagement portion being configured to engage the cord such that movement of the cord stopper along the cord is restricted when the first path is selected, and a cord passing portion in the channel defines the second path, the cord passing portion being configured to permit the cord stopper to move along the length of the cord when the second path is selected.

Securement of the cord stopper to the cord is thus achieved by rotating the cord stopper relative to the cord in order to select the first path. When the cord is passed along the first path of the channel, the cord engagement portion engages the cord, thereby to restrict movement of the cord stopper along the cord. Release of the cord stopper is effected by rotating the cord stopper relative to the cord, e.g. in the opposite direction to the direction of rotation required for selection of the first path, in order to select the second path. The cord can then be passed along the second path of the channel. The cord passing portion defining the second path permits movement of the cord stopper along the cord. When a new position along the cord is reached, the cord stopper may be rotated relative to the cord in order to (re-)select the first path to secure the cord stopper at the new position.

Thus, the cord stopper fulfils the functions of conventional cord stoppers without requiring moving parts, and with a relatively simple physical design. The cord stopper may thus be relatively straightforward and inexpensive to manufacture, for example by moulding the cord stopper/body as a single piece.

Moreover, the cord stopper may be particularly suitable for applications involving high frequency of use, such as for securing a drawstring of an item of clothing or a bag, because reliability of the cord stopper is not compromised by the moving parts of conventional cord stoppers in order to secure and release the cord stopper. Obviation of such moving parts may also mean that the cord stopper has particular suitability for use in outdoor environments.

The cord engagement portion may comprise a plurality of ridges protruding into the channel along the first path. The plurality of ridges may provide effective engagement with the cord when the cord is passed along the first path.

The plurality of ridges may comprise at least one pair of ridges which protrude towards each other from opposing surface portions of the channel. Thus, the cord may be squeezed between the opposing ridges when the cord is passed along the first path, which may assist the cord stopper to be secured to the cord.

The cord stopper may, for example, comprise a plurality of, such as two, three, four or more, opposing pairs of ridges in order to assist to reliable securement of the cord stopper to the cord.

The body may have an exterior surface, with first and second openings being delimited by the exterior surface. The channel may thus extend between the first and second openings.

In an embodiment, the channel widens from the first opening to the second opening such that the second opening is defined by an elongate aperture whose length separates a first end from an opposing second end of the second opening.

The first path may be adjacent a first channel surface portion, which first channel surface portion extends from a first side of the first opening to the first end of the second opening. In this case, the first side of the first opening opposes a second side of the first opening from which a second channel surface portion extends to the second end of the second opening.

Rotating the secured cord stopper relative to the cord may cause the cord to move towards or to the second end of the second opening in order to release the cord stopper. The cord stopper can then be moved along the cord.

The second channel surface portion preferably curves away from the first channel surface portion. A curvature of the second channel surface portion between the second side and the second end may be greater than a curvature of the first channel surface portion between the first side and the first end. The greater curvature of the second channel surface portion may assist the cord stopper to move along the cord when the second path is selected.

When the cord stopper includes the above-described at least one pair of ridges, the opposing surface portions, from which the respective ridges of the at least one pair of ridges protrude, are spaced apart from each other by the first channel surface portion extending between the opposing surface portions.

The body may comprise at least one gripping portion on the exterior surface of the body for assisting a user to grip the body. Alternatively or additionally, the body may be shaped such that the exterior surface provides at least one recessed portion in which to locate at least part of the user's hand.

The gripping portion and/or recessed portion may assist the user to rotate, e.g. rock, the cord stopper relative to the cord in order to select the first or second path, and may also assist the user to move the cord stopper along the cord.

In a non-limiting example, the cord stopper is used in combination with a climbing rope as the cord. In particular, two climbing ropes may be used, each having a cord stopper attached thereto. The climber may move along, e.g. climb or descend, the climbing ropes by supporting himself on the secured cord stopper of one rope, while moving the released cord stopper of the other.

Whilst not essential to this climbing method, the gripping portion and/or recessed portion may assist the climber to grip the cord stoppers and thereby ascend/descend the climbing ropes by rotating, e.g. rocking, the cord stopper and moving the cord stopper along the respective climbing rope.

The body may be a rigid body. By the body being thus resistant to being bent or forced out of shape, use of the cord stopper may be facilitated, and its robustness enhanced. The body may be formed, for example, from at least one selected from a metal, a metal alloy, and a polymer.

According to another aspect there is provided a cord stopper assembly comprising the cord stopper defined above, and the cord.

The cord may, for example, be supplied extending through the channel.

According to still another aspect there is provided an item of clothing comprising the cord stopper assembly. The item of clothing is not particularly limited, and may include, for example, a coat, trousers, a top, such as a hooded top, shoes, and so on.

A drawstring included in the item of clothing may, for example, define the cord.

According to yet another aspect there is provided a bag comprising the cord stopper assembly.

A drawstring included in the bag may, for example, define the cord.

More generally, the term "drawstring" may refer to a string, lace, or rope used to gather a fabric or other material. The gathering of the fabric or other material may, for instance, be used to close or adjust the size of an opening provided in the item of clothing or bag.

The drawstring may, for example, be threaded through a hem or casing included in the item of clothing or bag, or laced through holes.

According to a yet another aspect there is provided climbing apparatus comprising the cord stopper assembly.

The climbing apparatus may, for example, comprise one or a plurality of such cord stopper assemblies, e.g. two cord stopper assemblies, as previously described.

Further provided is a method of using a cord stopper comprising a body delimiting a channel having a first path and a second path defined therein, a cord engagement portion being provided along the first path, and a cord passing portion in the channel defining the second path, the method comprising: providing a cord passed through the channel; rotating the body relative to the cord such that the cord is passed along the first path, movement of the cord stopper along the cord being thereby restricted by the cord engagement portion; or rotating the body relative to the cord such that the cord is passed along the second path, the cord stopper being thereby permitted to move along the cord.

The method may further comprise moving the cord stopper along the cord when the second path is selected.

Yet further provided is a method for manufacturing the cord stopper defined above, the method comprising forming the body delimiting the channel.

The forming may comprise at least one selected from moulding the body, casting the body, machining the body, and 3D printing the body.

More generally, embodiments described herein in relation to the methods of use and manufacture of the cord stopper are applicable to embodiments of the cord stopper, and embodiments described herein in relation to the cord stopper are applicable to the methods of use and manufacture.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Provided is a cord stopper for moving along a length of cord and releasably engaging the cord. The cord stopper comprises a body delimiting a channel for passing the cord through the body. A first path and a second path for the cord are defined in the channel. The first path or the second path is selectable by rotating the body relative to the cord. A cord engagement portion is provided along the first path, and a cord passing portion in the channel defines the second path. The cord engagement portion is configured to engage the cord such that movement of the cord stopper along the cord is restricted when the first path is selected. The cord passing portion is configured to permit the cord stopper to move along the length of the cord when the second path is selected. Further provided is a cord stopper assembly comprising the cord stopper and the cord. Methods of using and manufacturing the cord stopper are also provided.

As shown in FIGS. 1-6, the cord stopper 10 comprises a body 12 delimiting a channel 14. The channel 14 permits a cord (not visible in FIGS. 1-6) to pass therethrough. The cord stopper 10 is movable along the cord via passing the cord through the channel 14.

Thus, the cord stopper 10 may not be fixed or mountable to another component or surface which would fix the position of the cord stopper 10 relative to that component/surface, since this would not permit the cord stopper 10 to be freely movable along the cord.

The cord stopper 10 may, for instance, not include any attachment member for affixing or mounting the cord stopper 10 to a component or surface.

The body 12 may be a rigid body. The body 12 may therefore be resistant to being bent or forced out of shape. This may facilitate use of the cord stopper 10 because the rigid body may enhance the ease with which the cord stopper 10 can be secured to/released from the cord, and moved along the cord. The rigid body 12 may also make for a relatively robust cord stopper 10.

The body 12 may be formed, for example, from at least one selected from a metal, a metal alloy, and a polymer.

Particular mention is made of stainless steel as an exemplary metal alloy, since this material combines hardness, strength, and corrosion resistance. The corrosion resistance of stainless steel may be particularly beneficial in examples where the cord stopper is intended for outdoor use.

Particular mention is made of engineering thermoplastic, such as a polyolefin, as an exemplary polymer. Suitable polyolefins include polyethylene, for example high molecular weight polyethylene (HDPE), or polypropylene, since they are both robust and relatively lightweight. Engineering thermoplastics may also be readily shapeable in order to form the body 12.

A method for manufacturing the cord stopper 10 comprises forming the body 12 delimiting the channel 14. Any suitable technique may be employed to form the body 12, such as moulding, casting, machining, and/or 3D printing.

In examples in which the body 12 is formed from the metal or metal alloy, the body 12 may be formed by, for example, casting, machining, 3D printing, or a combination thereof.

In examples in which the body 12 is formed from the polymer, in particular the engineering thermoplastic, the body 12 may be formed, for example, from moulding, e.g. injection moulding, or 3D printing. Forming the body 12 by injection moulding may facilitate mass production of the cord stopper 10.

Returning to FIGS. 1-6, a first path 16 and a second path 18 for the cord are defined in the channel 14. The first path 16 comprises a cord engagement portion 20 configured to engage the cord. The second path 18 comprises a cord passing portion 22 which is configured to permit the cord to pass through the channel 14 so that the cord stopper 10 is movable along the cord.

The first path 16 or the second path 18 is selectable by rotating the body 12 relative to the cord. In the non-limiting example depicted in FIGS. 1-6, this is achieved by rotating, e.g. rocking, the body 12 about an axis extending perpendicularly to the length of the cord.

When the first path 16 is selected by such rotation of the body 12, the cord is passed along the first path 16 and the cord engagement portion 20 engages the cord. This engagement restricts movement of the cord stopper 10 along the cord.

In the depicted example, release of the cord stopper 10 is effected by rotating the body 12 relative to the cord in the opposite direction to the direction of rotation required for selection of the first path. This causes the second path 18 to be selected. The cord can then be passed along the second path 18 of the channel 14. The cord passing portion 22 in the channel 14 defining the second path 18 permits movement of the cord stopper 10 along the cord. When a new position along the cord is reached, the cord stopper 10 may be rotated relative to the cord in order to (re-)select the first path 16 to secure the cord stopper 10 at the new position.

Thus, the cord stopper 10 fulfils the functions of conventional cord stoppers without requiring moving parts, and with a relatively simple physical design. The cord stopper may thus be relatively simple and inexpensive to manufacture, for example by forming, e.g. moulding, in particular injection moulding, casting, machining, or 3D printing, the body 12 as a single piece.

The absence of moving parts in the example depicted in FIGS. 1-6 may mean that the exemplary cord stopper 10 is particularly suitable for applications involving high frequency of use, such as for securing a drawstring of an item of clothing or a bag. This is because reliability of the cord stopper 10 may not be compromised by the moving parts of conventional cord stoppers in order to secure and release the cord stopper from the cord. Obviation of such moving parts may also mean that the cord stopper 10 has particular suitability for use in outdoor environments.

In the non-limiting example shown in FIGS. 1-6, the cord engagement portion 20 comprises a plurality of ridges 24A, 24B, 24C, 24D, 24E, 24F protruding into the channel 14 along the first path 16. The plurality of ridges 24A, 24B, 24C, 24D, 24E, 24F may assist to provide effective and reliable engagement of the cord stopper 10 with the cord when the cord is passed along the first path 16.

The plurality of ridges 24A, 24B, 24C, 24D, 24E, 24F may comprise at least one pair of ridges 24A, 24D; 24B, 24E; 24C, 24F which protrude towards each other from opposing surface portions 26A, 26B of the channel 14. Thus, the cord may be squeezed between the opposing ridges 24A, 24D; 24B, 24E; 24C, 24F when the cord is passed along the first path 16, which may assist securement of the cord stopper 10 to the cord.

The ridges 24A, 24B, 24C, 24D, 24E, 24F may have any suitable shape enabling the ridges 24A, 24B, 24C, 24D, 24E, 24F to engage the cord. In the depicted example, the ridges 24A, 24B, 24C, 24D, 24E, 24F each taper as they extend away from the respective surface portion 26A, 26B. Such tapering, e.g. to a point distal from the respective surface portion 26A, 26B, may assist each of the ridges 24A, 24B, 24C, 24D, 24E, 24F to exert pressure on the cord, such as to facilitate engagement of the cord stopper 10 with the cord.

Three pairs of opposing ridges 24A, 24D; 24B, 24E; 24C, 24F are present in the example shown in FIGS. 1-6. Such a plurality of pairs of opposing ridges 24A, 24D; 24B, 24E; 24C, 24F may assist in terms of providing more reliable securement of the cord stopper 10 to the cord, e.g. compared to the scenario in which only a single pair of opposing ridges is provided. Different numbers of pairs of opposing ridges 24A, 24D; 24B, 24E; 24C, 24F may also be contemplated, such as three, four, or more. In another example, one pair of opposing ridges 24A, 24D is provided.

Figure 1:
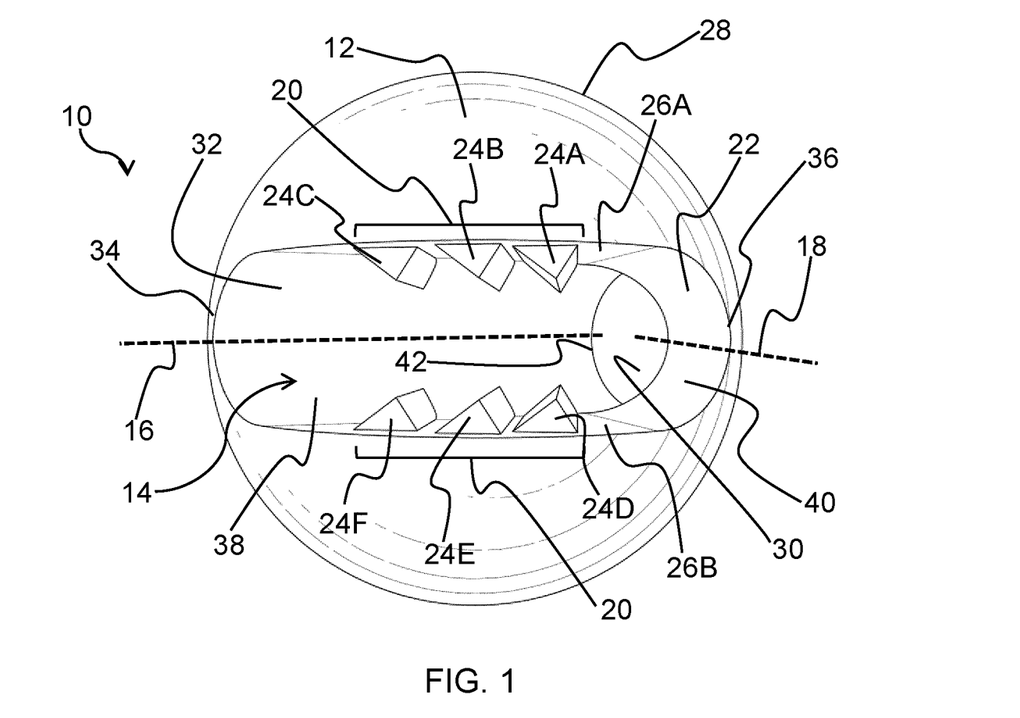
FIG. 1 provides a first perspective view of a cord stopper according to an example.
Figure 2:
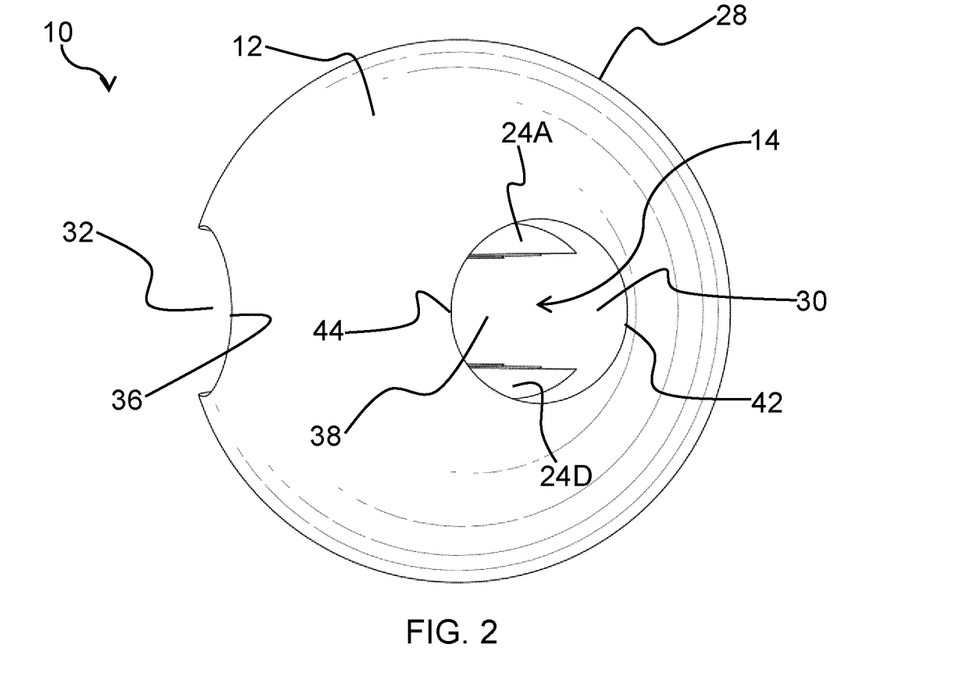
FIG. 2 provides a second perspective view of the cord stopper shown in FIG. 1.
Figure 3:
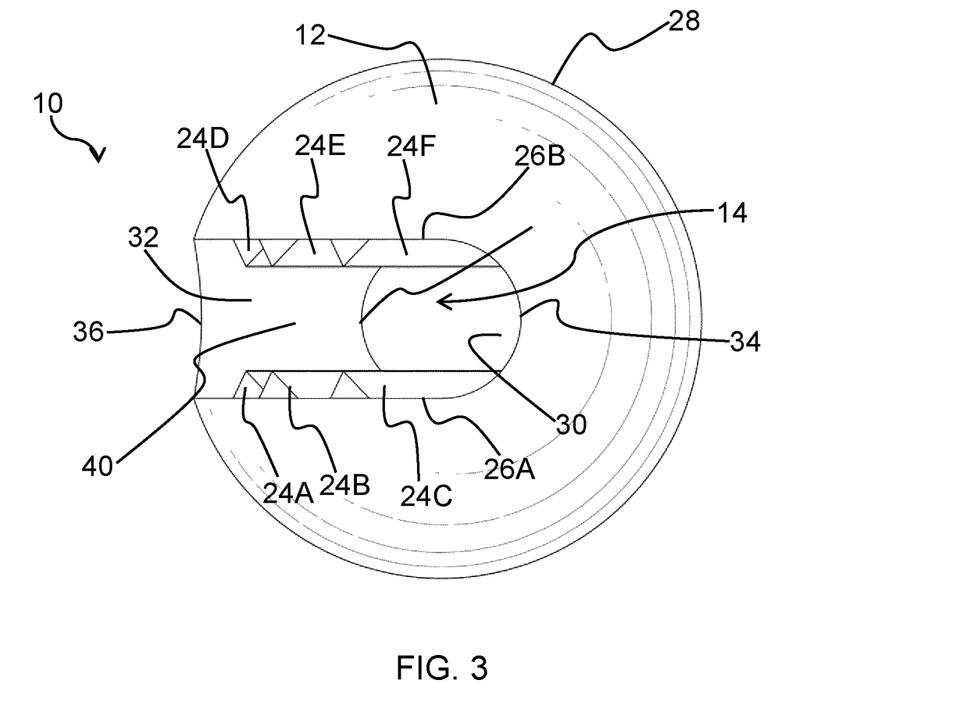
FIG. 3 provides a third perspective view of the cord stopper shown in FIG. 1.
Figure 4:
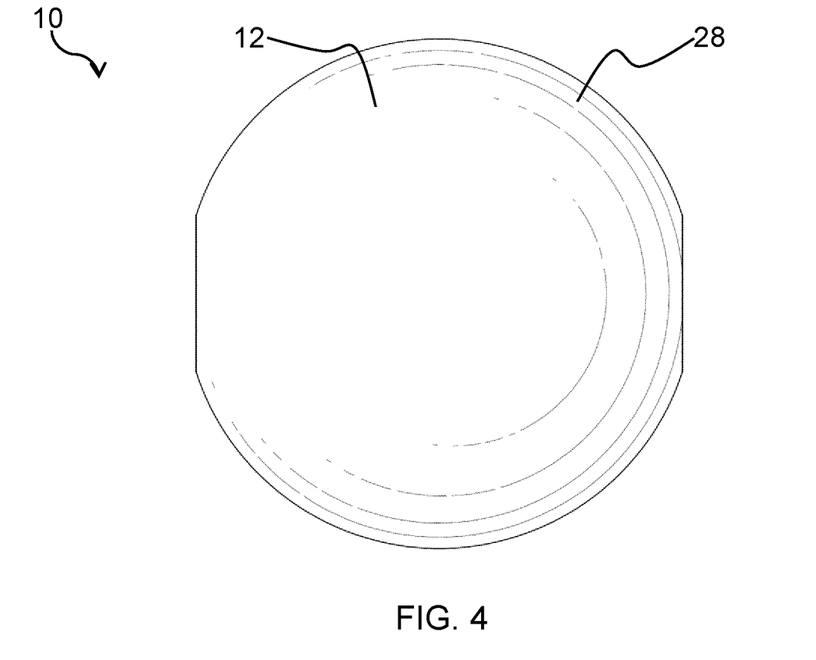
FIG. 4 provides a fourth perspective view of the cord stopper shown in FIG. 1.
Figure 5:
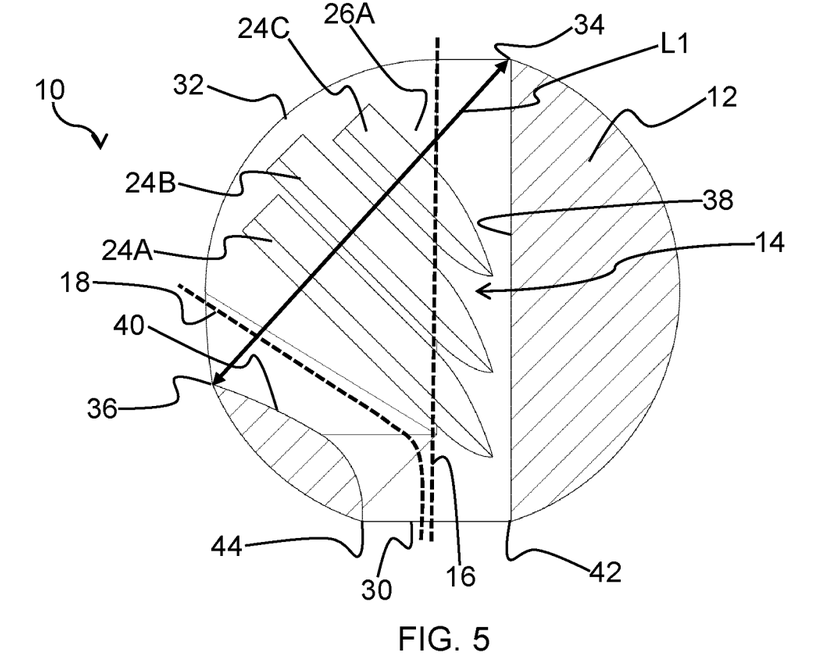
FIG. 5 provides a cross-sectional view of the cord stopper shown in FIG. 1.

Each of the plurality of ridges 24A, 24B, 24C, 24D, 24E, 24F may, for example, be elongated and arranged such that the longest dimension of the respective ridge 24A, 24B, 24C, 24D, 24E, 24F extends obliquely across the first path 16, as best shown in FIG. 5.

The body 12 of the exemplary cord stopper 10 shown in FIGS. 1-6 has an exterior surface 28. First and second openings 30, 32 of the channel 14 are delimited by the exterior surface 28. The channel 14 extends between the first and second openings 30, 32, as shown.

In an embodiment, the channel 14 widens from the first opening 30 to the second opening 32 such that the second opening 32 is defined by an elongate aperture whose length L1 separates a first end 34 from an opposing second end 36 of the second opening 32.

Thus, rotating the secured cord stopper 10 relative to the cord may cause the cord to move towards or to the second end 36 of the second opening 32 in order to release the cord stopper 10 so that the cord stopper 10 can be moved along the cord. This rotating, e.g. rocking, of the body 12 of the cord stopper 10 on the cord provides a convenient way of securing the cord stopper 10 to, and releasing the cord stopper 10 from, the cord.

The first path 16 may extend adjacent to a first channel surface portion 38, and the second path 18 may extend adjacent to a second channel surface portion 40.

Figure 6:
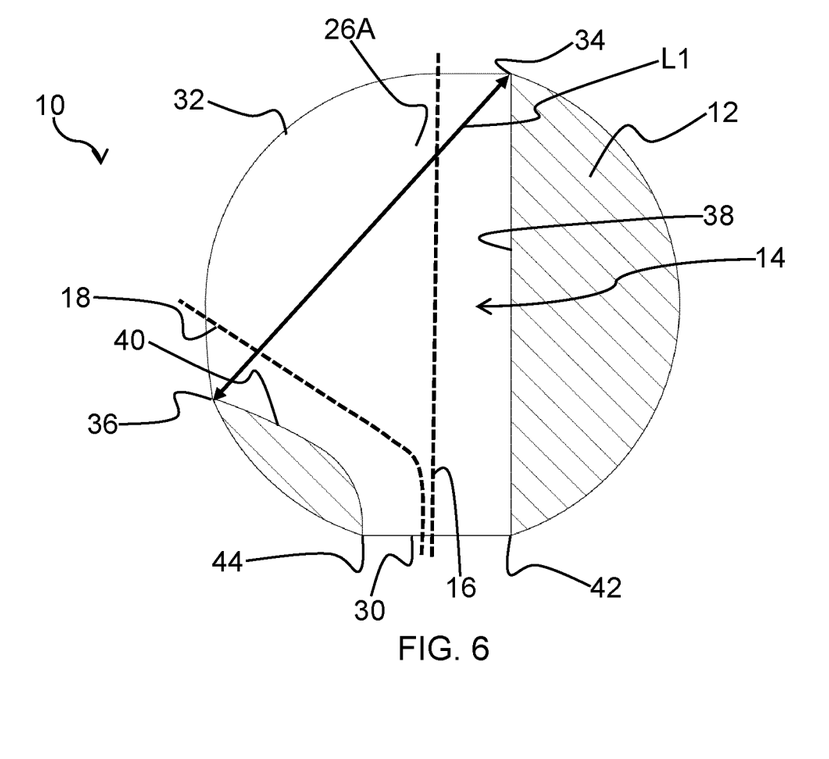
FIG. 6 provides a further cross-sectional view of the cord stopper in which the ridges evident in FIG. 5 are removed for clarity.

As best shown in FIGS. 5 and 6, the first channel surface portion 38 extends from a first side 42 of the first opening 30 to the first end 34 of the second opening 32. The first side 42 of the first opening 30 opposes a second side 44 of the first opening 30. Moreover, as shown in the depicted example, the second channel surface portion 40 extends from the second side 44 of the first opening 30 to the second end 36 of the second opening 32.

The second channel surface portion 40 preferably curves away from the first channel surface portion 38. This assists selection of the first or second path via the above-described rotation/rocking of the body 12 of the cord stopper 10 on the cord.

In the example shown in FIGS. 1-6, a curvature of the second channel surface portion 40 between the second side 44 and the second end 36 is greater than a curvature of the first channel surface portion 38 between the first side 42 and the first end 34.

The greater curvature of the second channel surface portion 40 relative to the first channel surface portion 38 may assist the cord stopper 10 to move along the cord when the second path 18 is selected.

More generally, the surface of the cord passing portion 22 along which the cord is passable, e.g. the second channel surface portion 40 described above, may be smooth, e.g. ridge-free, such that the cord stopper 10 may move smoothly along the cord when the second path 18 is selected.

In the depicted example, the opposing surface portions 26A, 26B of the channel 14, from which the respective ridges 24A, 24B, 24C, 24D, 24E, 24F of the at least one pair of ridges 24A, 24D; 24B, 24E; 24C, 24F protrude, are spaced apart from each other by the first channel surface portion 38 extending between the opposing surface portions 26A, 26B.

As shown in FIGS. 1-6, a spacing between adjacent pairs of the three (or more) ridges 24A, 24B, 24C; 24D, 24E, 24F protruding from a respective surface portion 26A, 26B may become successively smaller closer to the first opening 30. Thus, the cord may be gripped more tightly closer to the first opening 30, and more loosely closer to the second opening 32. This may assist to balance secure gripping of the cord when the first path 16 is selected with relatively facile selection of the second path 18.

Whilst not visible in the Figures, the body 12 may, in certain examples, comprise at least one gripping portion on the exterior surface 28 of the body 12 for assisting a user to grip the body 12. Alternatively or additionally, the body 12 may be shaped such that the exterior surface provides at least one recessed portion in which to locate at least part of the user's hand, such as at least one digit.

The gripping portion and/or recessed portion may assist the user to rotate, e.g. rock, the cord stopper 10 relative to the cord in order to select the first path 16 or the second path 18, and may also assist the user to move the cord stopper 10 along the cord.

The body 12 of the depicted cord stopper 10 has a substantially spherical exterior surface 28. This shape may facilitate grasping of the body 12, and gives the cord stopper 10 a ball-like appearance which is familiar for users of conventional cord stoppers. This shape should not, however, be regarded as being limiting, and the exterior surface 38 of the body 12 may have any suitable shape, e.g. a barrel shape.

The absence of moving parts in the design also assists to permit the exterior of the cord stopper 10 to be substantially defined by the exterior surface 28 which may assist to avoid accidental snagging of the cord stopper 10 on other objects during use.

Figure 7:
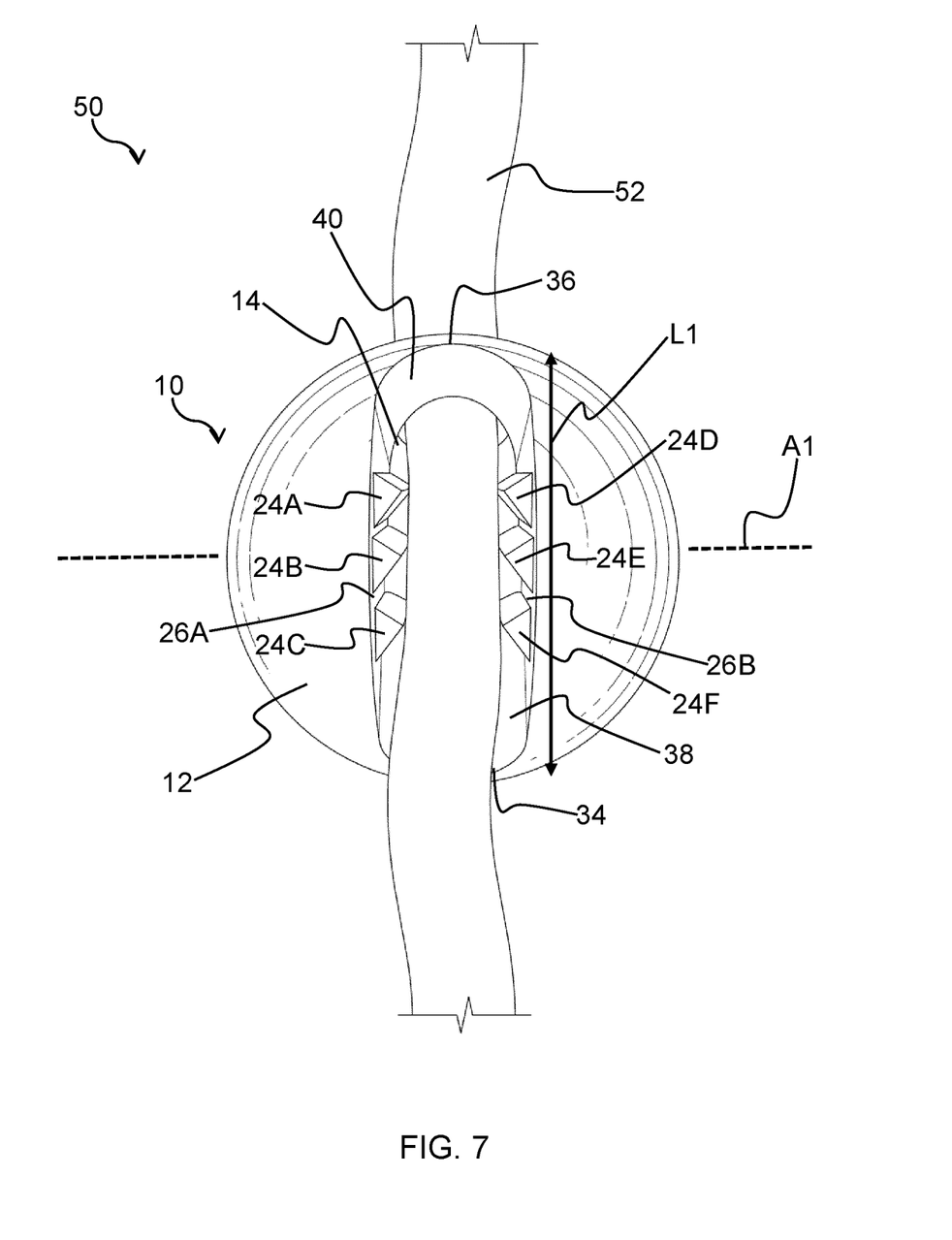
FIG. 7 provides a view of a cord stopper assembly according to an example.

FIG. 7 shows a cord stopper assembly 50 comprising the cord stopper 10 described above in relation to FIGS. 1-6, and a cord 52. The cord 52 is shown passed through the channel 14, and in particular passed along the first path 16 of the channel 14. Thus, the cord stopper 10 is secured to the cord 52 in the configuration depicted in FIG. 7.

The first path 16 or the second path 18 is selectable by rotating the body 12 relative to the cord 52, e.g. by rotating the body 12 about the axis A1 extending perpendicularly to the length of the cord 52, as previously described.

The cord 52 may be any suitable type, provided that the cord 52 can be engaged by the cord engagement portion 20 of the cord stopper 12. The cord 52 may, for example, be formed of several strands braided, twisted, or woven together.

In an embodiment, the cord stopper assembly 50 is included in an item of clothing (not visible), such as in a coat, trousers, a top, such as a hooded top, shoes, and so on.

Alternatively, the cord stopper assembly 50 may be included in a bag (not visible).

A drawstring included in the item of clothing or bag may, for example, define the cord 52. The drawstring may, for instance, be configured to open, close or adjust the size of an opening provided in the item of clothing or bag.

For example, the drawstring may be threaded through a hem or casing included in the item of clothing or bag, or laced through holes.

In such examples, moving the cord stopper 10 along the drawstring may facilitate adjustment of the item of clothing or bag, e.g. by assisting to adjust the opening/closing of the item of clothing or bag. The robustness of the cord stopper 10, owing in part to its capability to engage and be released from the cord 52 without moving parts, may mean that it is particularly suitable for such applications involving relatively high frequency of use.

The cord stopper 10 may alternatively or additionally, owing to its robustness, be usefully employed for outdoor applications.

In an embodiment, the cord stopper assembly 50 is included in climbing apparatus (not visible). In this case, the cord 52 may be, for example, defined by a climbing rope for supporting a climber.

In a non-limiting example, the climbing apparatus comprises a plurality of such cord stopper assemblies 50, e.g. two cord stopper assemblies 50.

In such an example, two climbing ropes 52, each having a cord stopper 10 attached thereto, may be used by a climber. The climber may move along, e.g. climb or descend, the climbing ropes 52 by supporting himself on the secured cord stopper 10 of one rope 52, while moving the released cord stopper 10 of the other rope 52.

Whilst not essential to this climbing method, the above-described gripping portion and/or recessed portion may assist the climber to grip the cord stoppers 10 and thereby ascend/descend the climbing ropes 52 by rotating, e.g. rocking, the cord stopper 10 and moving the cord stopper 10 along the respective climbing rope 52.

Figure 8:
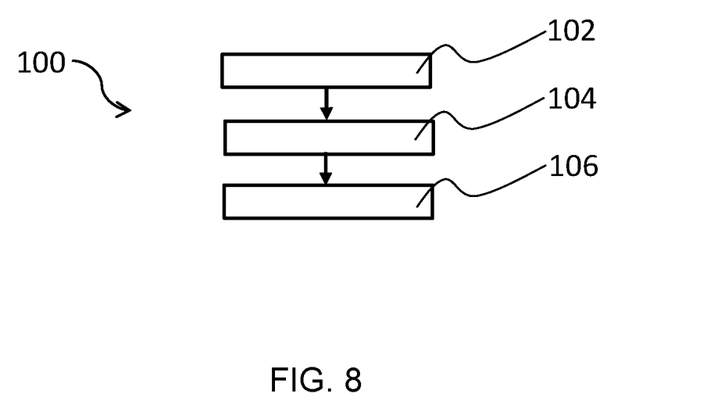
FIG. 8 provides a flowchart of a method of using a cord stopper.

FIG. 8 provides a flowchart of a method 100 of using a cord stopper comprising a body delimiting a channel having a first path and a second path defined therein, a cord engagement portion being provided along the first path, and a cord passing portion in the channel defining the second path.

The method 100 may be performed, for example, using the cord stopper 10 described above, such as the exemplary cord stopper 10 shown in FIGS. 1-6.

The method 100 comprises providing 102 a cord passed through the channel, and rotating 104 the body relative to the cord such that the cord is passed along the first path; movement of the cord stopper along the cord being thereby restricted by the cord engagement portion. Alternatively, the method 100 comprises rotating 104 the body relative to the cord such that the cord is passed along the second path; the cord stopper being thereby permitted to move along the cord.

As shown in the flowchart of FIG. 8, the method 100 may further comprise moving 106 the cord stopper along the cord when the second path is selected.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A cord stopper for moving along a length of cord and releasably engaging the cord, the cord stopper comprising a body delimiting a channel for passing the cord through the body, wherein a first path and a second path for the cord are defined in the channel, the first path or the second path being selectable by rotating the body relative to the cord, and wherein a cord engagement portion is provided along the first path, the cord engagement portion being configured to engage the cord such that movement of the cord stopper along the cord is restricted when the first path is selected, and a cord passing portion in the channel defines the second path, the cord passing portion being configured to permit the cord stopper to move along the length of the cord when the second path is selected,     wherein the body has an exterior surface, and has first and second openings delimited by the exterior surface, and wherein the channel extends between the first and second openings,     wherein the channel widens from the first opening to the second opening such that the second opening is defined by an elongate aperture whose length separates a first end from an opposing second end of the second opening,     wherein the first path is adjacent a first channel surface portion which extends from a first side of the first opening to the first end, and the second path is adjacent a second channel surface portion which extends from a second side of the first opening to the second end, the first side opposing the second side, and     wherein a curvature of the second channel surface portion between the second side and the second end is greater than a curvature of the first channel surface portion between the first side and the first end.

2. The cord stopper according to claim 1, wherein the channel is arranged such that rotation of the body relative to the cord in a first direction permits selection of the first path, and rotation of the body relative to the cord in a second direction which is opposite to the first direction permits selection of the second path.

3. The cord stopper according to claim 1, wherein the cord engagement portion comprises a plurality of ridges protruding into the channel along the first path.

4. The cord stopper according to claim 3, wherein the plurality of ridges comprises at least one pair of ridges which protrude towards each other from opposing surface portions of the channel.

5. The cord stopper according to claim 1, wherein the second channel surface portion curves away from the first channel surface portion.

6. The cord stopper according to claim 1, wherein the cord engagement portion comprises a plurality of ridges protruding into the channel along the first path, the plurality of ridges comprising at least one pair of ridges which protrude towards each other from opposing surface portions of the channel, and wherein the opposing surface portions are spaced apart from each other by the first channel surface portion.

7. A cord stopper for moving along a length of cord and releasably engaging the cord, the cord stopper comprising a body delimiting a channel for passing the cord through the body, wherein a first path and a second path for the cord are defined in the channel, the first path or the second path being selectable by rotating the body relative to the cord, and wherein a cord engagement portion is provided along the first path, the cord engagement portion being configured to engage the cord such that movement of the cord stopper along the cord is restricted when the first path is selected, and a cord passing portion in the channel defines the second path, the cord passing portion being configured to permit the cord stopper to move along the length of the cord when the second path is selected,     wherein the body has an exterior surface, and has first and second openings delimited by the exterior surface, and wherein the channel extends between the first and second openings, and wherein the body comprises at least one gripping portion on the exterior surface for assisting a user to grip the body and/or wherein the body is shaped such that the exterior surface provides at least one recessed portion configured to receive at least part of the user's hand.

8. The cord stopper according to claim 1, wherein the body is a rigid body.

9. The cord stopper according to claim 1, wherein the body is formed from at least one material selected from the group consisting of a metal, a metal alloy, and a polymer.

10. A cord stopper assembly comprising:
the cord stopper according to claim 1; and
a cord.

11. An item of clothing comprising a cord stopper assembly, the cord stopper assembly comprising a cord stopper and a cord, wherein the cord stopper is for moving along a length of the cord and releasably engaging the cord, the cord stopper comprising a body delimiting a channel for passing the cord through the body, wherein a first path and a second path for the cord are defined in the channel, the first path or the second path being selectable by rotating the body relative to the cord, and wherein a cord engagement portion is provided along the first path, the cord engagement portion being configured to engage the cord such that movement of the cord stopper along the cord is restricted when the first path is selected, and a cord passing portion in the channel defines the second path, the cord passing portion being configured to permit the cord stopper to move along the length of the cord when the second path is selected; optionally wherein a drawstring included in the item of clothing defines said cord.

12. A bag comprising a cord stopper assembly, the cord stopper assembly comprising the cord stopper according to claim 1; and a cord; optionally wherein a drawstring included in the bag defines said cord.

13. A climbing apparatus comprising a cord stopper assembly, the cord stopper assembly comprising the cord stopper according to claim 1; and a cord; optionally wherein a climbing rope for supporting a climber included in the climbing apparatus defines said cord.

14. A method of using a cord stopper according to claim 1, the method comprising:
providing a cord passing through the channel; and
rotating the body relative to the cord such that the cord is passed along the first path, movement of the cord stopper along the cord being thereby restricted by the cord engagement portion; or rotating the body relative to the cord such that the cord is passed along the second path, the cord stopper being thereby permitted to move along the cord.

15. The method according to claim 14, further comprising moving the cord stopper along the cord when the second path is selected.

16. A method for manufacturing the cord stopper according to claim 1, the method comprising forming the body delimiting the channel.

17. The method according to claim 16, wherein the forming comprises at least one step of the group consisting of moulding the body, casting the body, machining the body, and 3D printing the body.

18. The cord stopper according to claim 1, wherein the cord engagement portion comprises a plurality of ridges protruding into the channel along the first path, the plurality of ridges comprising at least three pairs of ridges, ridges of each pair of ridges of the at least three pairs of ridges protruding towards each other from opposing surface portions of the channel, and wherein a spacing between adjacent pairs of the at least three pairs of ridges becomes successively smaller closer to the first opening.

19. The cord stopper according to claim 7, wherein the cord engagement portion comprises a plurality of ridges protruding into the channel along the first path, the plurality of ridges comprising at least three pairs of ridges, ridges of each pair of ridges of the at least three pairs of ridges protruding towards each other from opposing surface portions of the channel, and wherein a spacing between adjacent pairs of the at least three pairs of ridges becomes successively smaller closer to the first opening.

20. The item of clothing according to claim 11, wherein the body has an exterior surface, first and second openings being delimited by the exterior surface, the channel extending between the first and second openings, wherein the cord engagement portion comprises a plurality of ridges protruding into the channel along the first path, the plurality of ridges comprising at least three pairs of ridges, ridges of each pair of ridges of the at least three pairs of ridges protruding towards each other from opposing surface portions of the channel, and wherein a spacing between adjacent pairs of the at least three pairs of ridges becomes successively smaller closer to the first opening.

* * * * *